United States Patent Office 2,745,832
Patented May 15, 1956

2,745,832

METAL QUINOLINOLATES AND METHODS OF MAKING THE SAME

Joseph Fath, Morristown, and George J. Leitner, Roselle, N. J., assignors to Nuodex Products Co., Inc., Elizabeth, N. J., a corporation of New York No Drawing. Application March 8, 1954,
Serial No. 414,898

23 Claims. (Cl. 260—270)

This invention relates to fungicidal and fungistatic compositions and to methods of preparing the same.

More specifically, it relates to the production of compositions comprising metal salts of 8-hydroxy quinoline in a dissolved or solubilized state, enabling such compositions to be dispersed or diluted readily in suitable common solvents, aqueous or organic. Metal salts of 8-hydroxy quinoline in such a state of solution or dispersion may be readily applied to cellulosic materials, such as textile fabrics, paper, wood, leather, paints, varnishes, plastic compositions, wire coatings, and the like and for agricultural purposes.

The excellent fungicidal and microbicidal properties of the heavy metal salts of 8-hydroxy quinoline generally are well known and the high degree of fungicidal efficiency of copper 8-quinolinolate in particular has made this material, and compositions containing the same, of wide commercial use and application in recent years. It is also well known that copper 8-quinolinolate in insolubilized, powdered form has heretofore had only limited use because of its extreme insolubility in common aqueous and organic solvents, oils, or oily compositions, which prevent its efficient impregnation into cellulosic materials for the purpose of rendering the same resistant to deterioration from microbial attack.

The methods by which articles of commerce have been protected from deterioration by treating them, first, with an aqueous solution of sodium quinolinolate, and, second, with a solution of copper sulfate or other inorganic heavy metal salt have previously been described in the literature of the art. However, the disadvantages accompanying such a procedure, as, for example, uneven deposition, crocking, salt deposition and exposure to high alkalinity are well recognized.

In pursuing the general object of the present invention, therefore, it has been deemed desirable to arrive at liquid compositions containing completely solubilized metal salts of 8-hydroxy quinoline, substantially free of suspended or dispersed matter, wherein the metal salts are present in commercially applicable and economic quantities, as, for example, from 5 to 20% concentration. It has also been deemed desirable to achieve such compositions as are readily dilutable or dispersible in solvents, such as aromatic hydrocarbons, alcohols or water, which may be used for the impregnation of textiles, wood, paint or plastic compositions and such other articles of commerce as are to be rendered resistant to microbial attack.

A unique feature of the present invention is the fact that the compounds which render the metal salts of 8-hydroxy quinoline soluble, dilutable and dispersible are, of themselves, anti-microbial agents belonging to the class of quaternary ammonium salts of water insoluble carboxylic acids.

More particularly, the compounds used to render the metal salts of 8-hydroxy quinoline soluble, according to this invention, are of the chemical structure:

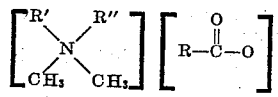

wherein R—COO represents the anion of a water insoluble carboxylic acid, wherein R' is represented by an alkyl, alkaryl, alkenyl group containing not more than 18 carbon atoms, and wherein R'' is represented by an alkyl, alkaryl, alkaryloxyalkoxyalkyl, hydroxy alkyl, carboxy alkyl, substituted alkaryl group.

Examples of such water insoluble acids are: 2-ethylhexoic acid, naphthenic acid, oleic acid, stearic acid, lauric acid, myristic acid, palmitic acid, linseed fatty acid, mixed rosin and fatty acids, etc.

Examples of R' are: the methyl, ethyl, octyl, dodecyl, cetyl, benzyl, stearyl, oleyl groups.

Examples of R'' are: the methyl, ethyl, butyl, dodecyl, oleyl, cetyl, benzyl, dischlorobenzyl, dimethylbenzyl, ethyl benzyl, hydroxy ethyl, carboxy ethyl, di-isobutyl phenoxyethoxy ethyl, di-isobutyl cresoxyethoxy ethyl, di-iso-butyl tolylmethyl groups.

In the preferred embodiment of our invention the following reaction steps are performed in order to obtain a liquid composition containing the metal salt of 8-hydroxy quinoline and the quaternary ammonium salt of a water insoluble carboxylic acid:

*Step I.*—The metathetical reaction of sodium 8-quinolinolate and a quaternary ammonium halide to yield a quaternary ammonium quinolinolate is as follows:

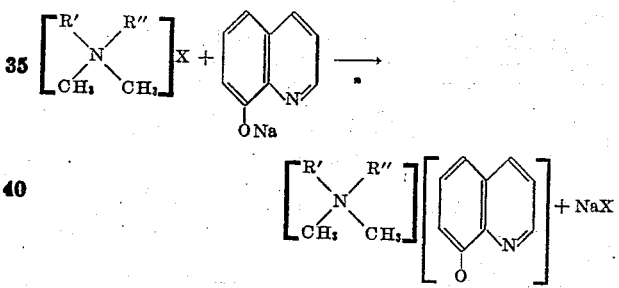

wherein X equals the chloride, bromide or sulphate ion.

*Step II.*—The reaction of the quaternary ammonium quinolinolate with a metal soap of a water insoluble organic acid is:

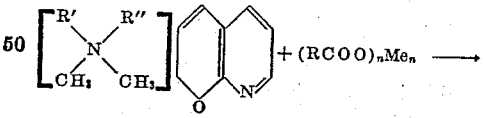

the composition of end product of this invention wherein Me is a metal of valence $n$.

Examples of Me are: copper, lead, zinc, chromium, manganese, calcium, cobalt, nickel, magnesium, mercury, etc.

Compositions according to the present invention, therefore, contain the reaction product of a quaternary ammonium quinolinolate and the metal salt of a water insoluble carboxylic acid.

It should also be noted that the quaternary ammonium quinolinolate complexes herein described are themselves compounds of high microbicidal, fungicidal efficiency in the protection of cellulosic matter.

This invention comprises, inter alia, a two-step process. The first step comprises the reaction of sodium quinolinolate and a quaternary ammonium halide, while the second step comprises the reaction of the quaternary ammonium quinolinolate formed in Step I with a metal salt of a water insoluble organic acid.

Examples of the quaternary ammonium halides in Step I of the reaction hereinbefore described are:

Dodecyl dimethyl benzyl ammonium chloride,
Cetyl dimethyl benzyl ammonium chloride,
Trimethyl benzyl ammonium chloride,
Di-isobutyl phenoxyethoxy ethyl dimethyl benzyl ammonium chloride,
Di-iso-butyl cresoxyethoxy ethyl dimethyl benzyl ammonium chloride,
Dodecyl dimethyl 3, 4, dichlorobenzyl ammonium chloride,
Dodecyldimethyl dimethylbenzyl ammonium chloride,
Dodecyl dimethyl ethyl benzyl ammonium chloride,
Di-dodecyl dimethyl ammonium bromide,
Cetyl dimethyl ethyl ammonium chloride,
Cetyl trimethyl ammonium bromide,
Oleyl dimethyl ethyl ammonium bromide,
Dodecyl trimethyl ammonium chloride,
Myristyl trimethyl ammonium chloride,
Stearyl trimethyl ammonium chloride,
Dodecyl dimethyl hydroxyethyl ammonium chloride,
Di-iso-butyl tolylmethyl trimethyl ammonium bromide.

Examples of the metal salts of water insoluble carboxylic acids used in Step II of the above reaction are: copper naphthenate, zinc octoate, zinc naphthenate, copper oleate, mercury naphthenate, manganese naphthenate, lead naphthenate, chromium octoate, mercury oleate, copper oleate, copper salt of linseed fatty acid, zinc salt of mixed rosin and fatty acids, calcium, laurate, magnesium myristate, lead 2-ethylhexoate, copper palmitate, lead salt of mixed rosin and fatty acids, copper oleate, calcium 2-ethylhexoate, chromium laurate, cadmium myristate, cobalt salt of linseed fatty acid, magnesium naphthenate, manganese 2-ethylhexoate, nickel oleate, bismuth naphthenate, etc.

In practice the above reactions may be carried out in common organic solvents. This permits ready removal of the sodium halide formed in the course of the reaction and results in a liquid composition. This may be used as is or modified in any desirable way either alone or as part of a further formulation. Specific examples of such further formulations include the incorporation of suitable emulsifiers to render the composition water dispersible and the addition of ester type plasticizers for use in vinyl coating compositions.

Examples of common organic solvents in which these reactions may be carried out are: toluol, xylol, benzol, naphtha, ethylene glycol monoethylether, hexylene glycol, methylisobutyl ketone, di-isobutyl ketone, di-butyl ether, methylisobutyl carbinol, isopropanol, perchloroethylene, ethylene dichloride, di-octyl phthalate, tetraethylene glycol dioctoate, tricresyl phosphate, amyl acetate, etc.

For example, where it is desired to incorporate the composition of this invention in a vinyl film, it would be preferable to use as the solvent dioctyl phthalate, a plasticizer commonly used in vinyl film formulation.

It will be apparent from the foregoing that in the practicing of the two step process of this invention, we are able to employ raw materials which are well known and are readily obtainable. These raw materials when reacted in the manner described form the end product by a series of reactions occuring in situ to produce the novel end product hereinafter claimed.

The result of these reactions is entirely unexpected and could not be predicted for the reason that ordinarily the use of 8-hydroxyquinoline in the presence of soluble metal salts results in the deposition of the insoluble metal quinolinolate in the form of a precipitate, whereas the end product of this invention is a homogeneous liquid free of suspended matter.

The following examples serve to demonstrate the preparation of compositions described by the foregoing reaction:

EXAMPLE 1

Into a 2 liter 3 neck flask equipped with a stirrer, Dean-Stark water trap, reflux condenser, thermometer and addition funnel were added 145 gs. of 8-hydroxyquinoline, 354 g. of dodecyl dimethyl benzyl ammonium chloride (96% purity) and 500 g. xylol. Heating and agitation were begun and the temperature was raised to 100° C. At this temperature 40 g. sodium hydroxide dissolved in 40 g. water were added in a small stream. The temperature was raised to reflux and water was removed by azeotropic distillation. When no more water had distilled out of the mixture, the temperature was lowered to 80° C. and the solution filtered from a residue of sodium chloride. The sodium chloride cake was washed with several small portions of xylol and the filtrate was adjusted with xylol to weigh 1000 g. It was a clear, brown solution and contained dodecyl dimethyl benzyl ammonium 8-quinolinolate.

EXAMPLE 2

To 100 g. of the solution prepared in Example 1 were added 39.8 g. of a hydrocarbon solution of copper naphthenate containing 8% copper metal. The mixture was agitated at 50° C. in an open beaker and adjusted to weigh 176 g. with xylol. This composition contained 10% copper 8-quinolinolate and may be diluted with the common aromatic hydrocarbon and alcohol solvents.

EXAMPLE 3

To 100 g. of the solution prepared in Example 1 were added 27.3 g. of zinc naphthenate containing 12% zinc metal. Xylol was removed from the reaction mixture by vacuum distillation in the presence of 50 g. dioctyl phthalate. When all the xylol was removed, the solution was adjusted with dioctyl phthalate to weigh 177 g. and contained 10% zinc quinolinolate. It may be diluted with the common ester-type plasticizers.

EXAMPLE 4

To 100 g. of the solution prepared in Example 1 were added 43.2 g. of a solution of the lead salt of mixed fatty and rosin acids containing 24% lead metal. The reaction mixture was agitated in a beaker at 120° F. and 21.8 g. xylol were added. The solution contained 15% lead 8-quinolinolate and may be diluted for application with benzol, toluol, isopropyl alcohol or V. M. & P. naphtha.

EXAMPLE 5

In a 3 liter 3 neck flask equipped with agitator, thermometer, six inch fractionating column, water trap, reflux condenser and addition funnel, were placed 472 gs. of para di-isobutyl phenoxyethoxy ethyl dimethyl benzyl ammonium chloride monohydrate (98.8% purity), 500 g. ethylene glycol monoethylether, 50 g. benzene and 145 g. 8-hydroxyquinoline. While agitating the mixture, the temperature was raised to 100° C., when 40 g. sodium hydroxide dissolved in 40 g. water were added in a small stream through the addition funnel. Water was removed from the reaction mixture azeotropically by maintaining reflux. At the conclusion of the reaction, the benzene was removed from the mixture by adjusting the apparatus for fractional distillation and distilling until a vapor temperature of the ethylene glycol monoethylether boiling point had been obtained. The solution was cooled to 70° C. and filtered to remove sodium chloride. The clear, dark brown solution was adjusted to 1200 gs. weight with ethylene glycol monoethylether and contained para di-isobutyl phenoxyethoxy ethyl dimethyl benzyl ammonium quinolinolate.

EXAMPLE 6

To 120 g. of the solution prepared in Example 5 were added 31.8 g. copper oleate containing 10% copper metal.

24.2 g. ethylene glycol monoethylether were added and the mixture was agitated at 160° F. for 30 minutes. It contained 10% copper 8-quinolinolate and was soluble in isopropanol, methyl isobutyl carbinol, amylacetate, diisobutyl ketone and common hydrocarbon solvents.

EXAMPLE 7

To 120 g. of the solution prepared in Example 5 were added 40.0 g. calcium 2-ethylhexoate in perchloroethylene containing 5% calcium metal. The mixture was agitated at room temperature until homogeneous and adjusted to 164 g. with perchloroethylene. It contained 10% calcium 8-quinolinolate.

EXAMPLE 8

To 120 g. of the solution prepared in Example 5 were added 52 g. chromium laurate solution in ethylene glycol monoethylether, containing 5% chromium metal. The mixture was stirred at 140° F. until homogeneous. It contained 10% chromium 8-quinolinolate and was soluble in the common organic hydrocarbon, alcohol ketone and ester-type solvents.

EXAMPLE 9

Into a 3 liter 3 neck flask equipped with stirrer, thermometer, fractionating column, Dean-Stark tube, reflux condenser and addition funnel were placed 560 g. commercial didodecyl dimethyl ammonium chloride (75% active), 145 g. 8-hydroxyquinoline, 500 g. methyl isobutyl ketone, and 50 g. benzene. The mixture was agitated and heated to 90° C. At this temperature 40 g. sodium hydroxide dissolved in 40 g. water were added in a small stream. The reactants were heated to reflux and water was removed periodically from the Dean-Stark tube. Upon completion of water removal vacuum was applied and the mixture was distilled until the distillate contained only methylisobutyl ketone and all the benzene had been removed. The solution was filtered from residual sodium chloride and adjusted to weigh 1000 g. It contained didodecyl dimethyl ammonium quinolinolate.

EXAMPLE 10

To 100 g. of the solution prepared in Example 9 were added 28.3 g. cadmium myristate containing 19.8% cadmium metal and the mixture was heated to 180° F. until complete solution was obtained. The solution was adjusted with methyl isobutyl ketone to 133.3 g. and contained 15% cadmium 8-quinolinolate. It can be diluted with dioctyl phthalate, tricresyl phosphate or tetraethylene glycol dioctoate.

EXAMPLE 11

To 100 g. of the solution prepared in Example 9 were added at 120° F. 50 g. of a mineral spirits solution of the cobalt soap of linseed fatty acid containing 6% cobalt metal. When a clear solution had been obtained, agitation was discontinued. The reaction product contained 11.6% cobalt 8-quinolinolate and can be diluted for application with toluol, xylol, amyl acetate and the common alcohol solvents.

EXAMPLE 12

To 100 g. of the solution prepared in Example 9 were added 40 g. of a solution of magnesium naphthenate containing 3% magnesium metal. The mixture was agitated for about 20 minutes. It was adjusted to weigh 156 g. with mineral spirits and contained 10% magnesium 8-quinolinolate.

EXAMPLE 13

In a 3 liter 3 neck flask equipped with agitator, thermometer, addition funnel, fractionating column, water trap and reflux condenser were added 680 g. of a 60% aqueous solution of dodecyl dimethyl 3, 4 dichlorobenzyl ammonium chloride, 145 g. 8-hydroxyquinoline, 500 g. methyl isobutyl carbinol and 50 g. benzene. The mixture was heated to 90° C. with agitation and 80 g. of a 50% sodium hydroxide solution were added in a small stream. Heating was continued and water was removed by azeotropic distillation. Upon complete removal of the water, the benzene was distilled off by applying a small vacuum and collecting distillate until the distillate assumed the boiling point of methyl isobutyl carbinol. The mixture was filtered and the clear filtrate adjusted to weigh 1000 gs. It contained dodecyl dimethyl 3, 4 dichlorobenzyl ammonium quinolinolate.

EXAMPLE 14

To 100 g. of the solution prepared in Example 13 at 150° F. were added 34.4 g. of a methyl isobutyl carbinol solution of manganese 2-ethylhexoate containing 8% manganese metal. The mixture was agitated until homogenous and contained 12.8% manganese 8-quinolinolate. It may be reduced in concentration for further use with alcohols, hydrocarbons, ketones or esters.

EXAMPLE 15

To 100 g. of the solution prepared in Example 13 were added 49.0 g. of a solution of nickel oleate containing 6% nickel metal. The mixture was heated to 150° F. and maintained for 15 minutes at this temperature. It contained 11.6% nickel 8-hydroxyquinoline and may be reduced to lower concentrations with alcohols, hydrocarbons, and ketone solvents.

EXAMPLE 16

To 100 g. of the solution prepared in Example 13 were added 87.1 g. bismuth naphthenate containing 12% bismuth metal. The reactants were agitated at 140° F. until a homogeneous solution had been obtained. The solution formed contained 13.3% bismuth 8-quinolinolate and is dilutable with di-isobutyl ketone, isopropanol, ethylene glycol monoethylether, toluol, xylol, and V. M. & P. naphtha.

EXAMPLE 17

In a 3 liter 3 neck flask equipped with agitator, thermometer, water trap, reflux condenser and addition funnel were placed 145 g. 8-hydroxyquinoline, 600 g. benzene and 527 g. of a 50% solution of commercial dodecyl trimethyl ammonium chloride. The reactants were agitated and heated to 90° C. at which temperature 80 g. of a 50% sodium hydroxide solution were added. Heating was continued to maintain reflux of the water benzene azeotrope and water was periodically removed from the water trap. After all the water had been removed from the reaction mixture, it was filtered to separate out sodium chloride. To the filtrate was added 200 g. of tetraethyleneglycol dioctoate and the mixture was distilled in vacuum until all the benzene had been removed. It was adjusted to weigh 600 g. with tetraethylene glycol dioctoate and contained dodecyl trimethyl ammonium 8-quinolinolate.

EXAMPLE 18

To 60 g. of the solution prepared in Example 17 were added 31.8 g. copper oleate containing 10% copper metal. The mixture was heated to 180° F. and agitated until homogeneous. It contained 19.2% copper 8-quinolinolate and may be diluted with plasticizers for polyvinyl chloride compositions.

EXAMPLE 19

In 60 g. of the solution prepared in Example 17 were dissolved 29 g. zinc palmitate containing 11.3% zinc metal at 200° F. When complete solution had been obtained, the reaction mixture was cooled and contained 19.8% zinc 8-quinolinolate. It may be incorporated for blending in polyvinyl chloride coating formulations.

EXAMPLE 20

In 60 g. of the solution prepared in Example 17 were dissolved 38.3 g. lead stearate containing 27% lead by heating the mixture to 200° F. for 1 hour. At the end of this time the reaction product was cooled and contained 25.2% lead 8-quinolinolate. It may be added to a polyvinyl chloride formulation blend used for the manufacture of unsupported vinyl film.

EXAMPLE 21

To 100 g. of the solution prepared in Example 1 were added 39.8 g. of a mineral spirits solution of copper naphthenate containing 8% copper metal and 80.2 g. of polyoxyethylene esters of mixed fatty and rosin acids. The mixture was agitated until uniform. It contained 8% copper 8-quinolinolate and may be readily dispersed in water to yield a usable emulsion.

EXAMPLE 22

To 100 g. of the solution prepared in Example 1 were added 31.8 g. copper naphthenate containing 10% copper metal. The mixture was heated to 170° F. and stirred for 20 minutes. There was then added 31.7 g. polyoxyethylene sorbitol oleate-laurate and 12.5 g. polyoxyethylene sorbitan monopalmitate. Agitation was continued for one-half hour at 170° F. to effect complete solution. The composition was then cooled to room temperature. It contained 10% copper 8-quinolinolate and was ready emulsifiable with water for use in textile treating solutions.

The following tests demonstrate the efficacy of our products for their intended purposes:

*Description of compounds tested*

Compound A.—A composition containing the reaction product of dodecyl dimethyl benzyl ammonium 2-ethylhexoate and copper 8-quinolinolate wherein the concentration of copper 8-quinolinolate is 10.0%.

Compound B.—A composition containing the reaction product of dodecyl dimethyl benzyl ammonium 2-ethylhexoate and zinc 8-quinolinolate wherein the concentration of zinc 8-quinolinolate is 10.0%.

*Preparation and testing of fabrics*

10 oz. cotton duck was dip-impregnated with xylol solutions of compounds A and B, so as to give a final deposition of active fungicide as indicated in the following tables.

Specimens of each of the treated fabrics were subjected to a running water leaching for 24 hours at a rate of 8 liters per hour.

The treated fabrics were subjected to the following accelerated biological tests:

TABLE I.—*Aspergillus Niger* PURE CULTURE TEST

| Compound | Percent Fungicide | Unleached Specimens Incubation | | | | Leached Specimens Incubation | | | |
|---|---|---|---|---|---|---|---|---|---|
| | | 1 wk. | 2 wks. | 3 wks. | 4 wks. | 1 wk. | 2 wks. | 3 wks. | 4 wks. |
| A | 0.50% Copper 8-Quinolinolate | z,0 | z,0 | z,0 | z,0 | z,0 | 2 | 3 | 3 |
| | 1.0% Copper 8-Quinolinolate | z,0 | z,0 | z,0 | z,0 | z,0 | z,0 | z,0 | z,0 |
| | 2.0% Copper 8-Quinolinolate | z,0 | z,0 | z,0 | z,0 | z,0 | z,0 | z,0 | z,0 |
| B | 0.50% Zinc 8-Quinolinolate | z,0 | z,0 | z,0 | z,0 | z,0 | 3 | 5 | 8 |
| | 1.0% Zinc 8-Quinolinolate | z,0 | z,0 | z,0 | z,0 | z,0 | 1 | 3 | 5 |
| | 2.0% Zinc 8-Quinolinolate | z,0 | z,0 | z,0 | z,0 | z,0 | z,0 | z,0 | z,0 |
| | Control, None | 10 | 10 | 10 | 10 | 10 | 10 | 10 | 10 |

Legend: 1—slight growth; 1–9—increasing density and coverage of growth; 10—heavy growth; z,0—zone of inhibition surrounding sample and no growth.

TABLE II.—*Chaetomium Globosum* PURE CULTURE TEST

| Compound | Percent Fungicide | Unleached Specimens | | | | Leached Specimens | | | |
|---|---|---|---|---|---|---|---|---|---|
| | | 1 wk. | 2 wks. | 3 wks. | 4 wks. | 1 wk. | 2 wks. | 3 wks. | 4 wks. |
| A | 0.10% Copper 8-Quinolinolate | 0 | 0 | 0 | 0 | 0 | 0 | 0 | 0 |
| | 0.25% Copper 8-Quinolinolate | 0 | 0 | 0 | 0 | 0 | 0 | 0 | 0 |
| | 0.50% Copper 8-Quinolinolate | 0 | 0 | 0 | 0 | 0 | 0 | 0 | 0 |
| | 1.0% Copper 8-Quinolinolate | 0 | 0 | 0 | 0 | 0 | 0 | 0 | 0 |
| B | 0.25% Zinc 8-Quinolinolate | 0 | 0 | 0 | 0 | 0 | 2 | 6 | 9 |
| | 0.50% Zinc 8-Quinolinolate | 0 | 0 | 0 | 0 | 0 | 0 | 0 | 0 |
| | 1.0% Zinc 8-Quinolinolate | 0 | 0 | 0 | 0 | 0 | 0 | 0 | 0 |
| | 2.0% Zinc 8-Quinolinolate | 0 | 0 | 0 | 0 | 0 | 0 | 0 | 0 |
| | Control, None | 10 | 10 | 10 | 10 | 10 | 10 | 10 | 10 |

Legend: 0—no growth; 1–9—increasing density and coverage of growth; 10—heavy growth.

TABLE III.—SOIL BURIAL TEST

| Compound | Percent Fungicide | Percent retained tensile strength after Soil Burial | | | |
|---|---|---|---|---|---|
| | | Unleached Specimen | | Leached Specimen | |
| | | 2 wks. | 4 wks. | 2 wks. | 4 wks. |
| A | 0.25% Copper 8-Quinolinolate | 100 | 84 | 100 | 21 |
| | 0.50% Copper 8-Quinolinolate | 100 | 100 | 100 | 100 |
| | 1.0% Copper 8-Quinolinolate | 100 | 100 | 100 | 100 |
| | 2.0% Copper 8-Quinolinolate | 100 | 100 | 100 | 100 |
| B | 0.5% Zinc 8-Quinolinolate | 100 | 32 | 0 | 0 |
| | 1.0% Zinc 8-Quinolinolate | 100 | 97 | 0 | 0 |
| | 2.0% Zinc 8-Quinolinolate | 100 | 97 | 72 | 39 |
| | Control, None | 0 | 0 | 0 | 0 |

*Preparation and testing of paint films*

An outside white house paint of formula:

Pigment: | Percent
---|---
Basic sulfate white lead | 25.2
Zinc oxide | 25.2
Titanium magnesium (30% titanium dioxide) | 40.3
Magnesium silicate | 9.3
 | 100.0

Vehicle: | 
---|---
Raw linseed oil | 42.5
Heat treated linseed | 32.1
Mineral spirits and driers | 25.4
 | 100.0 was treated with various concentrations of compound A. Filter paper was given two brush coats of each paint on one side only, allowing adequate drying time between coats. A sample of each of the coated specimens was then leached for 24 hours in water flowing at the rate of 8 liters per hour.

The samples thus prepared were then subjected to the Pullularia test. This test is an accelerated technique designed to evaluate the mildew resistance of paints. According thereto, test specimens (1¼" squares) were superimposed on a nutrient agar medium which had been inoculated with a water suspension of the test organism (*Pullulari pullulans*). 0.2 on 1 of the spore suspension was placed on the test specimen and the Petri dishes were incubated at 28° C. The effect of the compound on the mildew resistance of the painted surface is indicated in Table IV below.

TABLE IV.—PULLULARIA TESTS

| Compound | Percent Fungicide | Unleached Samples | | | | | Leached Samples | | |
|---|---|---|---|---|---|---|---|---|---|
| | | 1 wk. | 2 wks. | 3 wks. | 4 wks. | 5 wks. | 1 wks. | 2 wks. | 3 wks. |
| A | 0.25% Copper 8-Quinolinolate | z,0 | z,0 | z,0 | z,0 | z,0 | 0 | 0 | 0 |
| | 0.30% Copper 8-Quinolinolate | z,0 | z,0 | z,0 | z,0 | z,0 | 0 | 0 | 0 |
| | 0.35% Copper 8-Quinolinolate | z,0 | z,0 | z,0 | z,0 | z,0 | 0 | 0 | 0 |
| | Control, None | 6 | 10 | 10 | 10 | 10 | 3 | 10 | 10 |

Legend: 0—no growth; 1–9—increasing density and coverage of growth; 10—heavy growth; z,0—zone of inhibition surrounding sample and no growth.

It will be apparent from the foregoing detailed description that the two step process of this invention is effective in the production of high efficiency in the carrying out of its intended purposes. This description sets forth the invention in illustrative forms, but the invention is to be understood as fully commensurate with the appended claims.

Having thus fully described the invention, what we claim as new and desire to secure by Letters Patent is:

1. Method of preparing an oil-soluble compound containing a polyvalent metal salt of 8-hydroxy quinoline which comprises: reacting a quaternary ammonium 8-quinolinolate of the structure

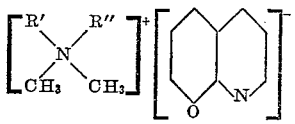

wherein R' is selected from the group consisting of an alkyl, alkaryl and alkenyl containing not more than 18 carbon atoms, and wherein R" is selected from the group consisting of an alkyl, alkaryl, alkaryloxyalkoxyalkyl, hydroxy alkyl, carboxy alkyl, and substituted alkaryl, with a substantially stoichiometric amount of a polyvalent metal salt of a water insoluble carboxylic acid.

2. The method according to claim 1, wherein the acid is a water insoluble and oil soluble acid.

3. The method according to claim 1, wherein the acid is naphthenic acid.

4. The method according to claim 1, wherein the quaternary ammonium salt of 8-hydroxy quinoline is the dodecyl dimethyl benzyl ammonium salt.

5. The method according to claim 1, wherein the quaternary ammonium salt of 8-hydroxy quinoline is the di-isobutyl phenoxyethoxy ethyl dimethyl benzyl ammonium salt.

6. The method of preparing a metal salt of 8-hydroxy quinoline which comprises: reacting dodecyl dimethyl benzyl ammonium 8-quinolinolate with copper naphthenate.

7. The method of preparing a metal salt of 8-hydroxy quinoline which comprises: reacting di-isobutyl phenoxyethoxy ethyl dimethyl benzyl ammonium 8-quinolinolate with zinc 2-ethylhexoate.

8. The method according to claim 1, wherein the reaction is carried out in the presence of a solvent.

9. The method according to claim 1, wherein the reaction is carried out in the presence of an aromatic hydrocarbon.

10. The method according to claim 1, wherein the reaction is carried out in the presence of a plasticizer ester.

11. An oil soluble composition containing the reaction product of a quaternary ammonium 8-quinolinolate of the structure

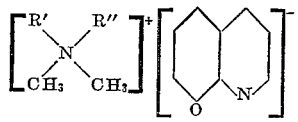

wherein R' is selected from the group consisting of an alkyl, alkaryl and alkenyl containing not more than 18 carbon atoms, and wherein R" is selected from the group consisting of an alkyl, alkaryl, alkaryloxyalkoxylalkyl, hydroxy alkyl, carboxy alkyl, and substituted alkaryl, with a substantially stoichiometric amount of a polyvalent metal salt of a water insoluble carboxylic acid.

12. Composition according to claim 11, wherein the quaternary ammonium 8-quinolinolate is dodecyl dimethyl benzyl ammonium 8-quinolinolate.

13. Composition according to claim 11, wherein the quaternary ammonium 8-quinolinolate is di-isobutyl phenoxyethoxy ethyl dimethyl ammonium 8-quinolinolate.

14. Composition according to claim 11, wherein the quaternary ammonium 8-quinolinolate is di-dodecyl dimethyl ammonium 8-quinolinolate.

15. Composition according to claim 11, wherein the quaternary ammonium quinolinolate is dodecyl trimethyl ammonium 8-quinolinolate.

16. Composition according to claim 11, wherein the quaternary ammonium quinolinolate is dimethyl 3,4 dichlorbenzyl ammonium 8-quinolinolate.

17. Composition according to claim 11, wherein the polyvalent metal salt of the water-insoluble carboxylic acid is a copper salt.

18. Composition according to claim 11, wherein the polyvalent metal salt of the water-insoluble carboxylic acid is copper naphthenate.

19. Composition according to claim 11, wherein the polvalent metal salt of the water-insoluble carboxylic acid is a zinc salt.

20. Composition according to claim 11, wherein the polyvalent metal salt of the water-insoluble carboxylic acid is a calcium salt.

21. Composition according to claim 11, wherein the polyvalent metal salt of the water-insoluble carboxylic acid is copper oleate.

22. An oil-soluble composition containing the reaction product of copper naphthenate and dodecyl dimethyl benzyl ammonium 8-quinolinolate.

23. An oil soluble composition containing the reaction product of copper oleate and di-isobutyl phenoxyethoxy ethyl dimethyl benzyl ammonium 8-quinolinolate.

References Cited in the file of this patent

UNITED STATES PATENTS

| 2,519,924 | Nowak | Aug. 22, 1950 |
| 2,561,380 | Kalberg | July 24, 1951 |

FOREIGN PATENTS

| 658,222 | Great Britain | Oct. 3, 1951 |